(12) United States Patent
Lu et al.

(10) Patent No.: US 7,614,797 B2
(45) Date of Patent: Nov. 10, 2009

(54) FIBER OPTIC CONNECTOR MECHANICAL INTERFACE CONVERTER

(75) Inventors: Yu Lu, Eden Prairie, MN (US); Randy Reagan, Clinton, MA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/657,403

(22) Filed: Jan. 24, 2007

(65) Prior Publication Data
US 2008/0175546 A1    Jul. 24, 2008

(51) Int. Cl.
G02B 6/36 (2006.01)
G02B 6/38 (2006.01)

(52) U.S. Cl. .............................. 385/53; 385/60; 385/88; 385/94

(58) Field of Classification Search .................... 385/53
See application file for complete search history.

(56) References Cited

U.S. PATENT DOCUMENTS

| | | |
|---|---|---|
| 4,140,366 A | 2/1979 | Makuch et al. |
| 4,140,367 A | 2/1979 | Makuch et al. |
| 4,142,776 A | 3/1979 | Cherin et al. |
| 4,174,882 A | 11/1979 | McCartney |
| 4,225,214 A | 9/1980 | Hodge et al. |
| 4,279,467 A | 7/1981 | Borsuk et al. |
| 4,354,731 A | 10/1982 | Mouissie |
| 4,684,205 A | 8/1987 | Margolin et al. |
| 4,705,352 A | 11/1987 | Margolin et al. |
| 4,715,675 A | 12/1987 | Kevern et al. |
| 4,725,120 A | 2/1988 | Parzygnat |
| 4,793,683 A | 12/1988 | Cannon, Jr. et al. |
| 4,820,185 A | 4/1989 | Moulin |
| 4,902,238 A | 2/1990 | Iacobucci |
| 4,907,853 A | 3/1990 | Hiratsuka |
| 4,961,623 A | 10/1990 | Midkiff et al. |

(Continued)

FOREIGN PATENT DOCUMENTS

DE     35 37 684 A1    4/1987

(Continued)

OTHER PUBLICATIONS

U.S. Appl. No. 11/607,676, filed Dec. 1, 2006 entitled "Network Interface Device".

(Continued)

*Primary Examiner*—Hemang Sanghavi
*Assistant Examiner*—Kajli Prince
(74) *Attorney, Agent, or Firm*—Merchant & Gould P.C.

(57) ABSTRACT

The present disclosure relates to a backward compatibility converter including a converter housing having a first end positioned opposite from a second end. The first end of the converter housing includes an end wall defining a first opening. The second end of the converter housing defines a second opening. The converter housing defines an internal passage that extends through the converter housing from the first opening to the second opening. The first end of the converter housing includes two paddles that project outwardly from the end wall. The paddles are positioned at opposite sides of the first opening and include inner surfaces that oppose each other. The converter housing defines internal threads located within the internal passage. The backward compatibility converter also includes a coupling nut rotatably mounted about an exterior of the converter housing adjacent the second end of the converter housing. The backward compatibility converter further includes a sealing member mounted about the exterior of the converter housing at a location between the coupling nut and the first end of the converter housing.

19 Claims, 5 Drawing Sheets

U.S. PATENT DOCUMENTS

| | | | |
|---|---|---|---|
| 5,042,901 A | 8/1991 | Merriken et al. |
| 5,104,242 A | 4/1992 | Ishikawa |
| 5,212,752 A | 5/1993 | Stephenson et al. |
| 5,214,830 A | 6/1993 | Rozycki |
| 5,267,342 A | 11/1993 | Takahashi et al. |
| 5,276,750 A | 1/1994 | Manning |
| 5,283,848 A | 2/1994 | Abendschein et al. |
| 5,317,663 A | 5/1994 | Beard et al. |
| 5,465,313 A | 11/1995 | Belenkiy et al. |
| 5,590,229 A | 12/1996 | Goldman et al. |
| 5,633,970 A | 5/1997 | Olson et al. |
| 5,715,342 A | 2/1998 | Nodfelt et al. |
| 5,751,874 A | 5/1998 | Chudoba |
| 5,778,122 A | 7/1998 | Giebel et al. |
| 5,887,095 A | 3/1999 | Nagase |
| 5,892,870 A | 4/1999 | Fingler et al. |
| 5,920,669 A | 7/1999 | Knecht et al. |
| 5,923,804 A | 7/1999 | Rosson |
| 5,940,559 A | 8/1999 | Noll |
| 5,946,436 A | 8/1999 | Takashi |
| 5,971,625 A | 10/1999 | Lu |
| 5,993,071 A | 11/1999 | Hultermans |
| 6,149,313 A | 11/2000 | Giebel et al. |
| 6,151,432 A | 11/2000 | Nakajima et al. |
| RE37,028 E | 1/2001 | Cooke et al. |
| 6,179,475 B1 | 1/2001 | Takamatsu et al. |
| 6,186,670 B1 | 2/2001 | Austin et al. |
| 6,188,822 B1 | 2/2001 | McAlpine et al. |
| RE37,079 E | 3/2001 | Stephenson et al. |
| RE37,080 E | 3/2001 | Stephenson et al. |
| 6,206,579 B1 | 3/2001 | Selfridge et al. |
| 6,234,683 B1 | 5/2001 | Waldron et al. |
| 6,234,685 B1 | 5/2001 | Carlisle et al. |
| 6,254,278 B1 | 7/2001 | Andrews et al. |
| 6,264,374 B1 | 7/2001 | Selfridge et al. |
| 6,298,190 B2 | 10/2001 | Waldron et al. |
| 6,305,849 B1 | 10/2001 | Roehrs et al. |
| 6,357,929 B1 | 3/2002 | Roehrs et al. |
| 6,371,660 B1 | 4/2002 | Roehrs et al. |
| 6,419,402 B1 | 7/2002 | Zimmel |
| 6,427,035 B1 | 7/2002 | Mahony |
| 6,428,215 B1 | 8/2002 | Nault |
| 6,461,057 B2 | 10/2002 | Chen |
| 6,466,725 B2 | 10/2002 | Battey et al. |
| 6,496,641 B1 | 12/2002 | Mahony |
| 6,522,804 B1 | 2/2003 | Mahony |
| 6,539,147 B1 | 3/2003 | Mahony |
| 6,540,410 B2 | 4/2003 | Childers et al. |
| 6,542,674 B1 | 4/2003 | Gimblet |
| 6,546,175 B1 | 4/2003 | Wagman et al. |
| 6,568,861 B2 | 5/2003 | Benner et al. |
| 6,579,014 B2 | 6/2003 | Melton et al. |
| 6,614,980 B1 | 9/2003 | Mahony et al. |
| 6,619,697 B2 | 9/2003 | Griffioen et al. |
| 6,625,375 B1 | 9/2003 | Mahony |
| 6,629,782 B2 | 10/2003 | McPhee et al. |
| 6,648,520 B2 * | 11/2003 | McDonald et al. ............ 385/78 |
| 6,652,156 B2 | 11/2003 | Shinagawa et al. |
| 6,655,851 B1 | 12/2003 | Lee |
| 6,668,127 B1 | 12/2003 | Mahony |
| 6,678,448 B2 | 1/2004 | Moisel et al. |
| 6,685,361 B1 | 2/2004 | Rubino et al. |
| 6,695,489 B2 | 2/2004 | Nault |
| 6,702,478 B2 | 3/2004 | Inagaki et al. |
| 6,714,710 B2 | 3/2004 | Gimblet |
| 6,739,759 B1 | 5/2004 | Seeley |
| 6,783,281 B2 | 8/2004 | Cheng |
| 6,785,450 B2 | 8/2004 | Wagman et al. |
| 6,789,950 B1 | 9/2004 | Loder et al. |
| 6,817,902 B2 | 11/2004 | Bernardi et al. |
| 6,848,836 B2 | 2/2005 | Ueda et al. |
| 6,899,467 B2 | 5/2005 | McDonald et al. |
| 6,909,821 B2 | 6/2005 | Ravasio et al. |
| 6,916,120 B2 | 7/2005 | Zimmel et al. |
| 6,962,445 B2 | 11/2005 | Zimmel et al. |
| 7,044,650 B1 | 5/2006 | Tran et al. |
| 7,090,406 B2 | 8/2006 | Melton et al. |
| 7,090,407 B2 * | 8/2006 | Melton et al. ................. 385/62 |
| 7,111,990 B2 | 9/2006 | Melton et al. |
| 7,113,679 B2 | 9/2006 | Melton et al. |
| 7,137,742 B2 | 11/2006 | Theuerkorn et al. |
| 7,146,090 B2 | 12/2006 | Vo et al. |
| 7,201,518 B2 | 4/2007 | Holmquist |
| 7,204,644 B2 | 4/2007 | Barnes et al. |
| 7,207,727 B2 | 4/2007 | Tran et al. |
| 7,234,877 B2 | 6/2007 | Sedor |
| 7,244,066 B2 | 7/2007 | Theuerkorn |
| 7,264,402 B2 | 9/2007 | Theuerkorn et al. |
| 7,292,763 B2 | 11/2007 | Smith et al. |
| 7,317,863 B2 | 1/2008 | Lu et al. |
| 7,331,719 B2 | 2/2008 | Manning et al. |
| 7,346,256 B2 | 3/2008 | Marrs et al. |
| 7,380,992 B2 | 6/2008 | Kramer et al. |
| 2001/0012428 A1 | 8/2001 | Nakajima et al. |
| 2001/0036345 A1 | 11/2001 | Gimblet et al. |
| 2002/0022392 A1 | 2/2002 | Below et al. |
| 2002/0062978 A1 | 5/2002 | Sakabe et al. |
| 2002/0081077 A1 | 6/2002 | Nault |
| 2003/0063867 A1 | 4/2003 | McDonald et al. |
| 2003/0094298 A1 | 5/2003 | Morrow et al. |
| 2003/0095754 A1 | 5/2003 | Matsumoto et al. |
| 2003/0095780 A1 | 5/2003 | Chang |
| 2004/0017983 A1 | 1/2004 | Chen et al. |
| 2004/0033028 A1 | 2/2004 | Cheng |
| 2004/0038588 A1 | 2/2004 | Bernardi et al. |
| 2004/0047566 A1 | 3/2004 | McDonald et al. |
| 2004/0120663 A1 | 6/2004 | Lail et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2005/0041928 A1 | 2/2005 | Zimmel et al. |
| 2005/0064752 A1 | 3/2005 | Serino |
| 2005/0117850 A1 | 6/2005 | Milette |
| 2005/0232553 A1 | 10/2005 | Holmquist |
| 2006/0056769 A1 | 3/2006 | Khemakhem et al. |
| 2006/0088247 A1 | 4/2006 | Tran et al. |
| 2006/0088248 A1 | 4/2006 | Tran et al. |
| 2006/0089049 A1 | 4/2006 | Sedor |
| 2006/0115219 A1 | 6/2006 | Mudd et al. |
| 2007/0025665 A1 | 2/2007 | Dean, Jr. et al. |
| 2007/0077010 A1 | 4/2007 | Melton et al. |
| 2008/0131132 A1 | 6/2008 | Solheid et al. |
| 2008/0175541 A1 | 7/2008 | Lu et al. |
| 2008/0175542 A1 | 7/2008 | Lu et al. |

FOREIGN PATENT DOCUMENTS

| | | |
|---|---|---|
| DE | 10 2004 049 697 A1 | 4/2006 |
| EP | 0 156 075 A2 | 10/1985 |
| EP | 0 547 778 A1 | 6/1993 |
| EP | 0 581 527 A1 | 2/1994 |
| EP | 0 689 069 A1 | 12/1995 |
| EP | 0 762 171 A1 | 3/1997 |
| EP | 0 855 610 A2 | 7/1998 |
| EP | 0 856 761 A1 | 8/1998 |
| EP | 0 940 700 A2 | 9/1999 |
| EP | 0 949 522 A2 | 10/1999 |
| EP | 0 997 757 A2 | 5/2000 |
| EP | 1 065 542 A1 | 1/2001 |
| EP | 1 258 758 A2 | 11/2002 |
| EP | 1 333 537 A1 | 8/2003 |
| EP | 1 457 793 A2 | 9/2004 |
| EP | 1 566 674 A1 | 8/2005 |
| GB | 2 154 333 A | 9/1985 |

| JP | 62-54204 | 3/1987 |
| JP | 5-106765 | 4/1993 |
| JP | 2001-116968 | 4/2001 |
| WO | WO 94/15232 | 7/1994 |
| WO | WO 00/31575 | 6/2000 |
| WO | WO 03/073819 A2 | 9/2003 |
| WO | WO 2005/072395 A2 | 8/2005 |

OTHER PUBLICATIONS

U.S. Appl. No. 11/657,402, filed Jan. 24, 2007 entitled "Hardened Fiber Optic Connector".

U.S. Appl. No. 11/657,404, filed Jan. 24, 2007 entitled "Hardened Fiber Optic Connector".

Delphi Connection Systems, "Harsh Environment Hermaphroditic Fiber Optic Connectors," 16 pages (© 2002).

Office Action mailed Jan. 11, 2008 in U.S. Appl. No. 11/657,402.

Opti Tap™ Connector. An Evolant Solutions Product, 2 pages (Sep. 2005).

Stratos Lightwave™ Brochure, "HDLC Hermaphroditic Butt Joint Connector," 2 pages (known as prior art at least as early as Sep. 8, 2003).

Stratos Lightwave™ Brochure, "HQLC Hermaphroditic Butt Joint Connector," 2 pages (known as prior art at least as early as Sep. 8, 2003).

International Search Report and Written Opinion mailed Jul. 1, 2008.

U.S. Appl. No. 12/115,966, filed May 6, 2008 entitled "Mechanical Interface Converter for Making Non-Ruggedized Fiber Optic Connectors Compatible with a Ruggedized Fiber Optic Adapter".

U.S. Appl. No. 12/115,982, filed May 6, 2008 entitled "Interface Converter for SC Fiber Optic Connectors".

U.S. Appl. No. 12/203,508, filed Sep. 3, 2008 entitled "Hardened Fiber Optic Connector Compatible with Hardened and Non-Hardened Fiber Optic Adapters".

U.S. Appl. No. 12/203,522, filed Sep. 3, 2008 entitled "Hardened Fiber Optic Connection System".

U.S. Appl. No. 12/203,530, filed Sep. 3, 2008 entitled "Hardened Fiber Optic Connection System with Multiple Configurations".

U.S. Appl. No. 12/203,535, filed Sep. 3, 2008 entitled "Hardened Fiber Optic Connector and Cable Assembly with Multiple Configurations".

* cited by examiner

FIG.5

FIBER OPTIC CONNECTOR MECHANICAL INTERFACE CONVERTER

TECHNICAL FIELD

The present disclosure relates to fiber optic data transmission, and more particularly to fiber optic cable connection systems.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes co-axially aligned ports (i.e., receptacles) for receiving the fiber optic connectors desired to be interconnected. The adapter includes an internal sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. The adapter also typically has a mechanical fastening arrangement (e.g., a snap-fit arrangement) for mechanically retaining the fiber optic connectors within the adapter. One example of an existing fiber optic connection system is described in U.S. Pat. Nos. 6,579,014, 6,648,520, and 6,899,467.

Fiber optic cable connection systems are frequently being upgraded to improve performance, ease of use, and circuit density. For an upgrade to be practical, it is desirable for the upgraded fiber optic connection system to be compatible with existing fiber optic connection system components that are already installed in the field. For example, it is desirable for upgraded fiber optic connectors to be able to interface with existing fiber optic adapters that may already be installed in the field. This type of compatibility is often called "reverse" or "backward" compatibility. Backward compatibility is advantageous because a service provider is not required to replace all of the fiber optic connectors and fiber optic adapters within their network every time an upgrade in fiber optic connection equipment is implemented. Backward compatibility also allows field technicians to maintain a stock of only the newer components, as opposed to both old and new components.

SUMMARY

One aspect of the present disclosure relates to a fiber optic connector mechanical interface converter for allowing a fiber optic connector to be backward compatible with an existing fiber optic adapter configuration.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Figure 1:
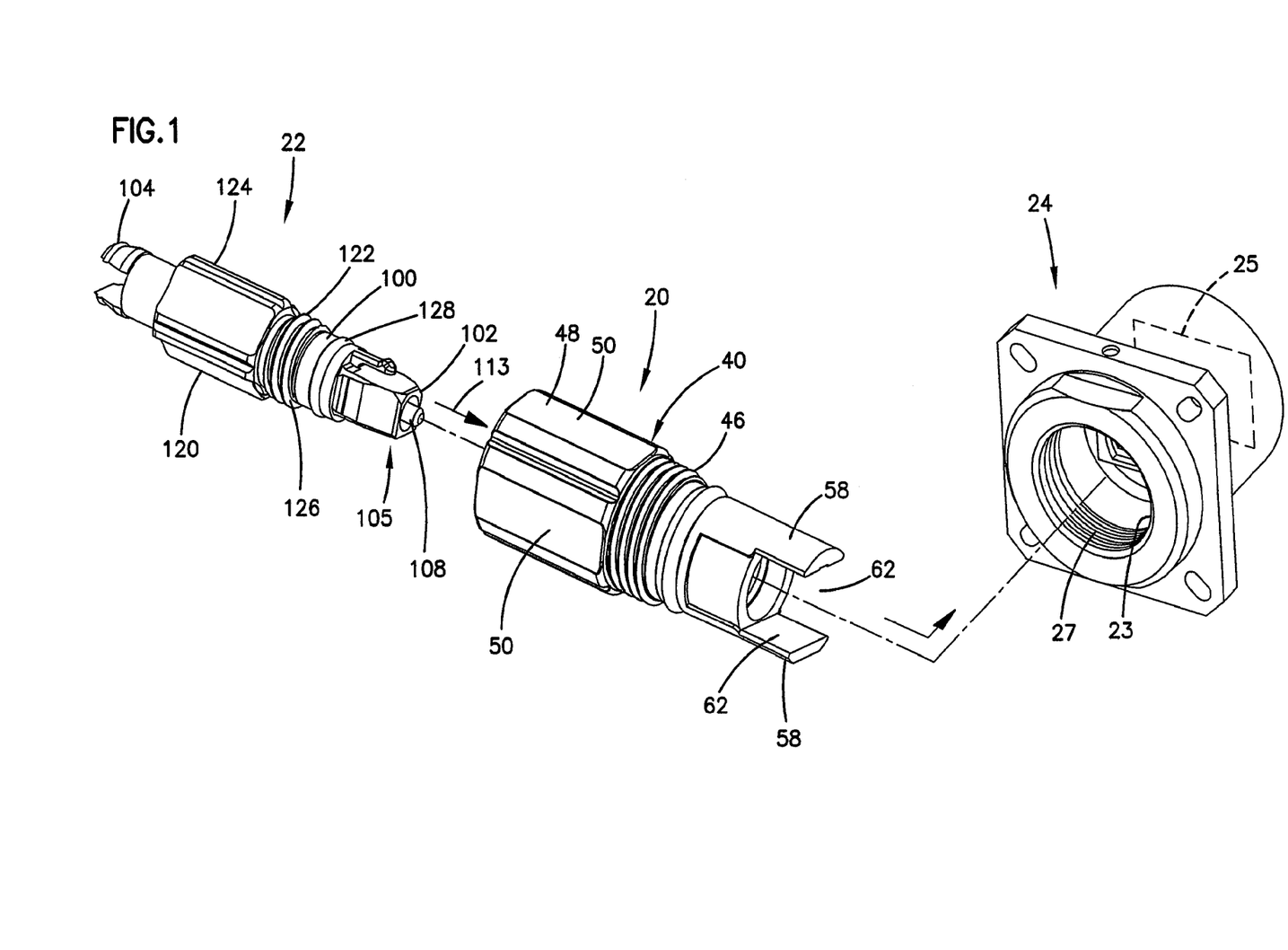
FIG. 1 is a perspective view of a backward compatibility converter used to allow a connector to mechanically interface with an existing adapter.

FIG. 1 shows a backward compatibility converter 20 having features that are examples of inventive aspects in accordance with the principles of the present disclosure. The backward compatibility converter 20 is configured to make a fiber optic connector 22 backward compatible with an existing fiber optic adapter 24. When the fiber optic connector 22 is inserted within the backward compatibility converter 20, the backward compatibility converter 20 provides the fiber optic connector 22 with a mechanical interface that is compatible with the mechanical interface of the fiber optic adapter 24. Thus, by using the backward compatibility converter 20, the fiber optic connector 22 can be inserted into and interlocked with the fiber optic adapter 24. In this way, the fiber optic adapter 24 can be used to optically connect the fiber optic connector 22 to another fiber optic connector.

The fiber optic adapter 24 includes a first port 23 for receiving a first fiber optic connector and an opposite second port 25 for receiving a second fiber optic connector. Internal threads 27 are defined within the first port 23. An adapter sleeve (not shown) for aligning the ferrules of the connectors is positioned within the fiber optic adapter 24. When the first and second connectors are mounted within the first and second ports 23, 25, the ferrules of the first and second connectors are received in the adapter sleeve and axially aligned with one another such that optical signals can be transferred between the first and second connectors. Further details regarding the fiber optic adapter 24 are disclosed in U.S. Pat. No. 6,579,014 that is hereby incorporated by reference in its entirety.

Figure 4:
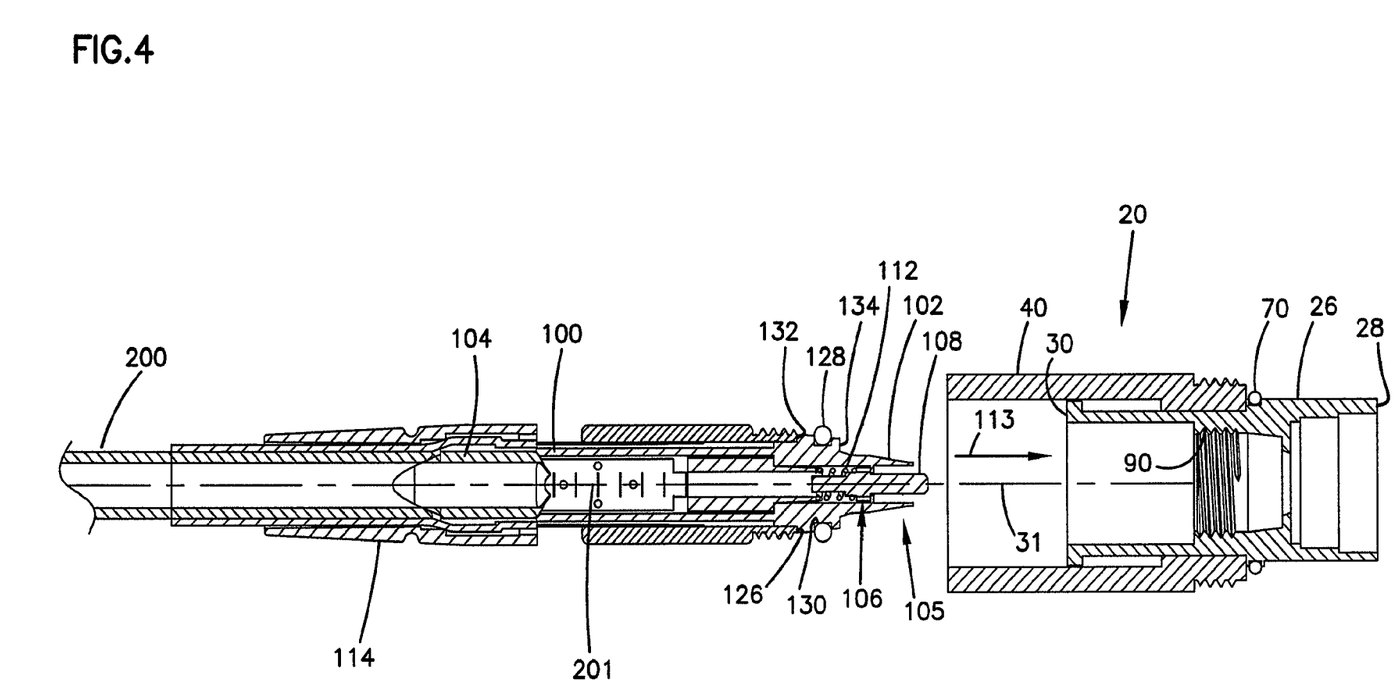
FIG. 4 is a cross-sectional view showing the fiber optic connector of FIGS. 1 and 2 aligned with the backward compatibility converter of FIGS. 1 and 2.

As shown at FIGS. 1 and 4, the fiber optic connector 22 includes a connector housing 100 adapted to be mounted at the end of a fiber optic cable 200. The connector housing 100 includes a first end 102 and a second end 104. The first end 102 defines a plug portion 105 at which a ferrule assembly 106 is mounted. The ferrule assembly 106 includes a ferrule 108 for supporting an optical fiber 201. The ferrule assembly 106 also includes a spring 112 (see FIGS. 4 and 5) for biasing the ferrule 108 in a direction of connector insertion 113. The fiber optic cable 200 is mechanically connected to the second end 104 of the connector housing 100. The fiber optic cable 200 includes at least one optical fiber 201 that extends through the connector housing 100 and has an end portion mounted within the ferrule 108. A flexible boot 114 (shown at FIGS. 4 and 5) can be positioned over the interface between the fiber optic cable 200 and the second end 104 of the connector housing 100.

Figure 2:
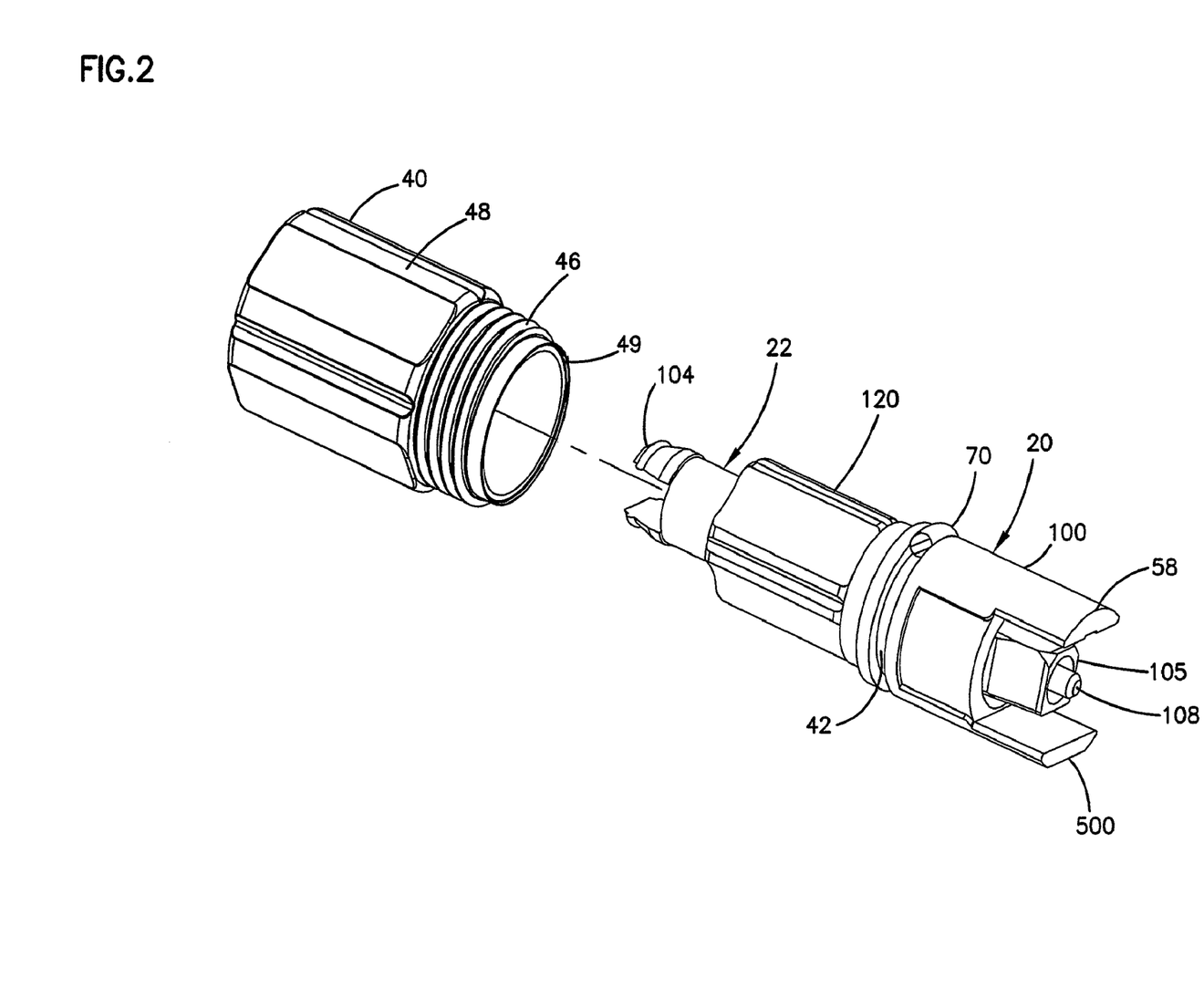
FIG. 2 is a partially exploded view of the backward compatibility converter with the fiber optic connector mounted therein.

Referring to FIGS. 1 and 2, the fiber optic connector 22 also includes a coupling nut 120 rotatably mounted about the exterior of the connector housing 100. The coupling nut 120 includes an exteriorly threaded portion 122 and a gripping portion 124. The gripping portion 124 allows the coupling nut 120 to be manually grasped so that the coupling nut can easily be manually turned about the exterior of the connector housing 100. One end of the coupling nut 120 is shown including an end wall 126.

Figure 5:
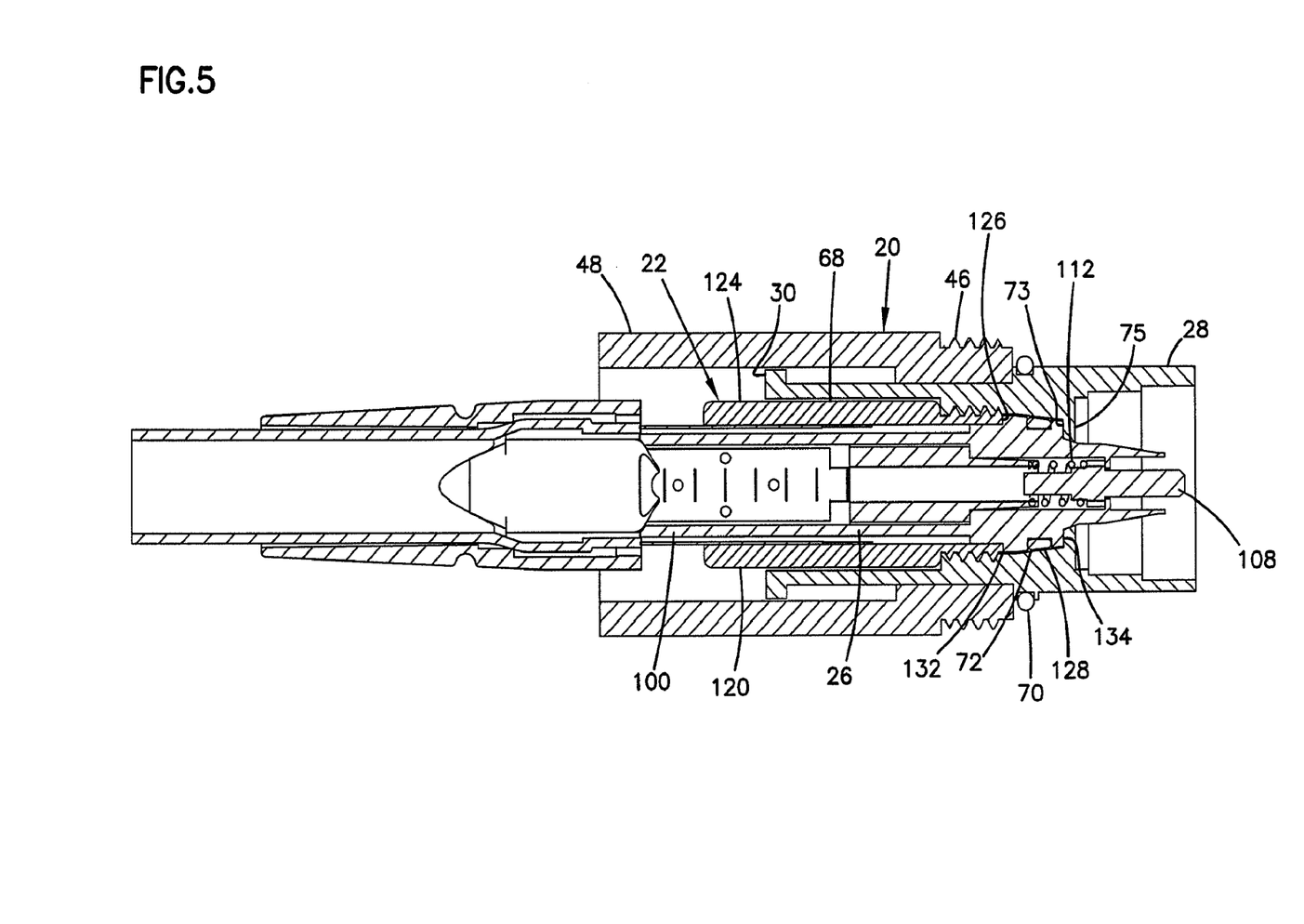
FIG. 5 is a cross-sectional view showing the fiber optic connector of FIGS. 1 and 2 inserted within the backward compatibility converter of FIGS. 1 and 2.

As shown in FIGS. 4 and 5, the fiber optic connector 22 also includes a sealing member 128 (e.g., a flexible o-ring) mounted within a groove 130 defined around a circumference/periphery of the connector housing 100. The groove 130 is located at a region of the connector housing 100 defined between exterior shoulders 132, 134. Further details regarding the fiber optic connector 22 are provided in U.S. patent application Ser. No. 11/657,402, entitled "Hardened Fiber Optic Connector", filed on Jan. 24, 2007, commonly assigned, and now U.S. Pat. No. 7,572,065, issued on Aug. 11, 2009, which is hereby incorporated by reference in its entirety.

Figure 3:
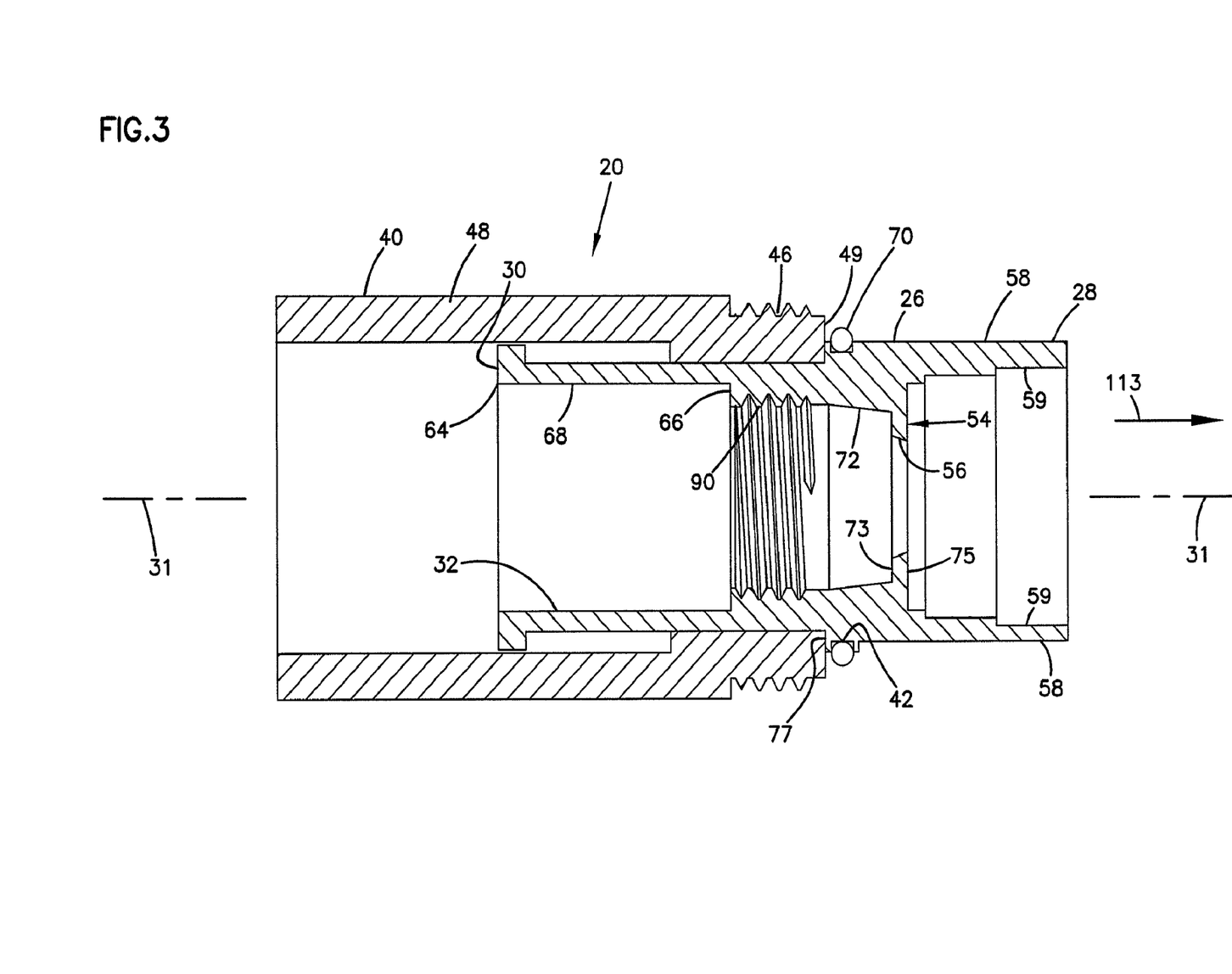
FIG. 3 is a cross-sectional view the housing of the backward compatibility converter of FIGS. 1 and 2.

Referring to FIGS. 2 and 3, the backward compatibility converter 20 includes a converter housing 26 defining a central passage 32 for receiving the fiber optic connector 22. The backward compatibility converter 20 also includes a coupling nut 40 rotatably mounted on the converter housing 26 for use in mechanically retaining the backward compatibility converter within the first port 23 of the fiber optic adapter 24. The backward compatibility converter 20 further includes a sealing member 70 (e.g., a flexible o-ring seal) mounted about the periphery/outer circumference of the converter housing 26 for providing an environmental seal between the fiber optic adapter 24 and the converter housing 26 when the backward compatibility converter 20 is secured within the first port 23 of the fiber optic adapter 24.

Referring to FIG. 4, the converter housing 26 of the backward compatibility converter 20 includes a first end 28 and an opposite second end 30. The converter housing 26 defines a central axis 31 that extends through the converter housing 26 from the first end 28 to the second end 30. The central passage 32 extends through the converter housing 26 along the central axis 31. The first end 28 of the converter housing 26 is configured to be mechanically compatible with the first port 23 of the fiber optic adapter 24. For example, the first end 28 of the converter housing 26 can have a shape that complements, mates with or is otherwise mechanically compatible with the shape of the first port 23 of the fiber optic adapter 24. The second end 30 of the converter housing 26 is configured to allow the plug portion 105 of the fiber optic connector 22 to be inserted into the central passage 32. The converter housing 26 also defines an exterior, circumferential groove 42 that extends about the periphery of the converter housing 26. The sealing member 70 of the backward compatibility converter 20 is mounted in the circumferential groove 42. An exterior shoulder 77 is located at the exterior of the converter housing 26 adjacent to the sealing member 70.

As indicated above, the first end 28 of the converter housing 26 has mechanical characteristics that are compatible with the internal shape of the first port 23 defined by the fiber optic adapter 24. For example, the first end 28 includes an end wall 54 defining a first opening 56, and also includes a pair of paddles 58 that project outwardly from the end wall 54 along the direction of connector insertion 113. The paddles 58 are positioned on opposite sides of the central axis 31 of the converter housing 26 and have inner surfaces 59 that oppose one another. Open side gaps 62 are defined between the paddles 58.

Referring to FIG. 3, the second end 30 of the converter housing 26 defines a second opening 64 for allowing the plug portion 105 of the fiber optic connector 22 to be inserted into the central passage 32 through the second end 30 of the converter housing 26. The central passage 32 extends from the second opening 64 through the converter housing 26 to the first opening 56. Within the central passage 32, the converter housing 26 defines a radial shoulder 66 that provides a diameter reduction from a gripping portion receptacle 68 to an internally threaded portion 90. The central passage 32 is also defined by a circumferential sealing surface 72 located between the internally threaded portion 90 and the first opening 56. The sealing surface 72 extends from the internally threaded portion 90 to a shoulder defined by a first side 73 of the end wall 54. A second side 75 of the end wall 54 faces in the direction of connector insertion 113.

The coupling nut 40 of the backward compatibility converter 20 is mounted at the second end 30 of the converter housing 26 and is free to rotate about the exterior of the converter housing 26 (e.g., about the central axis 31). The coupling nut 40 includes an externally threaded portion 46 and a gripping portion 48. An end wall 49 of the coupling nut 40 is located adjacent one end of the threaded portion 46. The gripping portion 48 has a larger outer diameter than the threaded portion 46. The gripping portion 48 defines a plurality of longitudinal depressions or finger grooves 50 for facilitating grasping the gripping portion 48. The threaded portion 46 is sized to be threaded within the internal threads 27 defined within the first port 23 of the fiber optic adapter 24 to secure the backward compatibility converter 20 to the fiber optic adapter 24. A user can thread the threaded portion 46 of the coupling nut 40 into the internal threads 27 of the fiber optic adapter 24 by inserting the threaded portion 46 into the first port 23 of the fiber optic adapter 24 and manually turning the coupling nut 40 about the converter housing 26 to thread the threaded portion 46 into the first port 23. The gripping portion 48 facilitates gripping and manually turning the coupling nut 40. In one embodiment, the coupling nut 40 can withstand a pullout force of at least 100 pounds when threaded in the first port 23.

To use the backward compatibility converter 20, the fiber optic connector 22 is inserted into the central passage 32 through the second opening 64. The fiber optic connector 22 is inserted into the central passage 32 until the plug portion 105 projects through the first opening 56 and shoulder 134 of the fiber optic connector 22 abuts against the first surface 73 of the end wall 54. As so positioned, a tapered region of the fiber optic connector 22 nests within the sealing surface 72 defined within the central passage 32 of the converter housing 26. Additionally, the sealing member 128 forms a seal between the connector housing 100 and the sealing surface 72 of the converter housing 26. Thereafter, the coupling nut 120 of the fiber optic connector 22 is threaded into the internally threaded portion 90 of the converter housing 26 until the shoulders 132, 134 of the fiber optic connector housing 100 are compressed between the first side 73 and the end wall 126 of the coupling nut 120, and the gripping portion 124 of the coupling nut 120 is within the gripping portion receptacle 68. With the fiber optic connector 22 mounted within the backward compatibility converter 20, the plug portion 105 of the fiber optic connector 22 projects axially outwardly from second side 75 of the end wall 54 and is positioned at a location between the paddles 58.

Once the fiber optic connector 22 is mounted within the backward compatibility converter 20, the combined components can be coupled to the fiber optic adapter 24. For example, the first end 28 of the backward compatibility converter 20 can be inserted within the first port 23 of the fiber optic adapter 24. As so inserted, the ferrule 108 is received within a corresponding adapter sleeve positioned within the fiber optic adapter 24, and the paddles 58 are received within corresponding receptacles within the fiber optic adapter 24. Additionally, the sealing member 70 is positioned to provide a circumferential seal between the converter housing 26 and the fiber optic adapter 24. To insure that the fiber optic connector 22 is fully inserted within the fiber optic adapter 24, the threaded portion 46 of the coupling nut 40 is preferably threaded into the internal threads 27 of the fiber optic adapter 24. Threading of the threaded portion 46 into the internal threads 27 can be done manually by grasping the gripping portion 48 and manually turning the coupling nut 40. The coupling nut 40 can be turned until the end 49 of the coupling nut 40 abuts against the exterior shoulder 77 of the converter housing 26. In this manner, the coupling nut 40 firmly secures the fiber optic connector 22 within the fiber optic adapter 24. By unthreading the coupling nut 40 from the fiber optic adapter 24, and axially pulling the backward compatibility converter 20 from the fiber optic adapter 24, the backward compatibility converter 20 and the fiber optic connector 22 can be disconnected from the fiber optic adapter 24. Similarly, the fiber optic connector 22 can be removed from the backward compatibility converter 20 by unthreading the coupling nut 120 and axially pulling the fiber optic connector 22 outwardly from the converter housing 26.

From the forgoing detailed description, it will be evident that modifications and variations can be made in the devices of the disclosure without departing from the spirit or scope of the invention. For example, while the present disclosure shows the backward compatibility converter used with single fiber connectors adapters, the backward compatibility converter can also be used with multi-fiber (i.e., multi-termination) fiber optic connectors and adapters.

What is claimed is:

1. A backward compatibility converter for receiving and converting a fiber optic connector, the fiber optic connector being at least partially inserted into the backward compatibility converter, the backward compatibility converter comprising:
    a converter housing having a first end positioned opposite from a second end, the first end of the converter housing including an end wall defining a first opening, the second end of the converter housing defining a second opening, the converter housing defining an internal passage that extends through the converter housing from the first opening to the second opening;
    the end wall including a first side and an opposite second side, the first side of the end wall defining a first shoulder and the second side of the end wall facing in a direction of insertion of the fiber optic connector;
    the first end of the converter housing including two paddles that project outwardly from the second side of the end wall, the paddles being positioned at opposite sides of the first opening and including inner surfaces that oppose each other;
    the internal passage of the converter housing defining internal threads located within the internal passage;
    the internal passage of the converter housing defining a sealing surface extending from the internal threads to the first shoulder of the first side of the end wall;
    a coupling nut rotatably mounted about an exterior of the converter housing adjacent the second end of the converter housing, the coupling nut including external threads; and
    a first sealing member mounted about the exterior of the converter housing at a location between the coupling nut and the first end of the converter housing;
    wherein the fiber optic connector is insertable through the second opening into the internal passage of the converter housing;
    wherein the fiber optic connector includes a second sealing member that forms a seal with the sealing surface of the internal passage of the converter housing when the fiber optic connector is inserted into the internal passage of the converter housing; and
    wherein the fiber optic connector includes a second shoulder that abuts against the first shoulder of the first side of the end wall of the converter housing when the fiber optic connector is inserted into the internal passage of the converter housing through the second opening.

2. The backward compatibility converter of claim 1 further comprising open side gaps defined between the paddles.

3. The backward compatibility converter of claim 1, wherein the coupling nut is mounted at the second end of the converter housing.

4. The backward compatibility converter of claim 1, wherein the coupling nut includes a gripping portion.

5. The backward compatibility converter of claim 4, wherein the gripping portion defines a plurality of longitudinal depressions.

6. The backward compatibility converter of claim 4, wherein the gripping portion has an outer diameter that is larger than an outer diameter of the external threads of the coupling nut.

7. A backward compatible fiber optic connector assembly comprising:
    a backward compatibility converter including:
        a converter housing having a first end positioned opposite from a second end, the first end of the converter housing including an end wall defining a first opening, the second end of the converter housing defining a second opening, the converter housing defining an internal passage that extends through the converter housing from the first opening to the second opening;
        the end wall of the converter housing including a first side and an opposite second side, the first side of the end wall defining a first shoulder and the second side of the end wall facing in a direction of connector insertion;
        the first end of the converter housing including two paddles that project outwardly from the second side of the end wall, the paddles being positioned at opposite sides of the first opening and including inner surfaces that oppose each other;

the internal passage of the converter housing defining internal threads located within the internal passage; and a first coupling nut rotatably mounted about an exterior of the converter housing adjacent the second end of the converter housing, the first coupling nut including external threads; and a fiber optic connector including:

a connector housing having a first end defining a plug portion and a second end for coupling to a fiber optic cable, the connector housing also having a second shoulder between the first and the second ends;

a ferrule assembly, which is mounted to the plug portion of the connector housing, including a ferrule for mounting an optical fiber from the fiber optic cable; and a second coupling nut, which is mounted about an exterior of the connector housing, including a set of external threads, wherein the external threads of the second coupling nut are threadingly engagable with the internal threads of the internal passage of the converter housing:

wherein the plug portion of the first end of the connector housing of the fiber optic connector is insertable in the direction of connector insertion into the internal passage of the converter housing through the second opening of the second end of the converter housing:

wherein the plug portion of the fiber optic connector projects through the first opening in the converter housing and is disposed between the two paddles of the converter housing when the external threads of the second coupling nut of the fiber optic connector are fully threaded into the internal threads of the internal passage of the converter housing;

wherein the second shoulder of the connector housing of the fiber optic connector abuts against the first shoulder of the first side of the end wall of the converter housing when the external threads of the second coupling nut of the fiber optic connector are fully threaded into the internal threads of the internal passage of the converter housing: and wherein the fiber optic connector can be removed from the backward compatibility converter by unthreading the external threads of the second coupling nut of the fiber optic connector from the internal threads of the internal passage of the converter housing and axially pulling the fiber optic connector outwardly from the second opening of the second end of the converter housing.

8. The backward compatible fiber optic connector assembly of claim 7, wherein the backward compatibility converter includes a sealing member mounted about the exterior of the converter housing at a location between the first coupling nut and the first end of the converter housing.

9. The backward compatible fiber optic connector assembly of claim 7, wherein the fiber optic connector includes a sealing member that is mounted about the exterior of the connector housing and in sealing engagement with a sealing surface of the converter housing.

10. The backward compatible fiber optic connector assembly of claim 7, wherein the second coupling nut of the fiber optic connector includes a gripping portion.

11. The backward compatible fiber optic connector assembly of claim 7, wherein the ferrule assembly of the fiber optic connector includes a spring for biasing the ferrule in the direction of connector insertion.

12. A backward compatible fiber optic connector assembly comprising:

a backward compatibility converter including:

a converter housing having a first end positioned opposite from a second end, the first end of the converter housing including an end wall defining a first opening, the second end of the converter housing defining a second opening, the converter housing defining an internal passage that extends through the converter housing from the first opening to the second opening;

the end wall of the converter housing including a first side and an opposite second side, the first side of the end wall defining a first shoulder and the second side of the end wall facing in a direction of connector insertion;

the first end of the converter housing including two paddles that project outwardly from the second side of the end wall, the paddles being positioned at opposite sides of the first opening and including inner surfaces that oppose each other;

the converter housing defining an internally threaded portion located within the internal passage; and a first coupling nut rotatably mounted about an exterior of the converter housing adjacent the second end of the converter housing, the first coupling nut including external threads; and a fiber optic connector and cable assembly including:

a fiber optic cable;

a connector housing having a first end defining a plug portion and a second end coupled to the fiber optic cable, the connector housing also having a second shoulder between the first and the second ends;

a ferrule assembly, which is mounted to the plug portion of the connector housing, including a ferrule for mounting an optical fiber of the fiber optic cable; and a second coupling nut rotatably mounted about an exterior of the connector housing, including external threads;

wherein the plug portion of the first end of the connector housing of the fiber optic connector and cable assembly is inserted in the direction of connector insertion into the internal passage of the converter housing of the backward compatibility converter through the second opening of the second end of the converter housing;

wherein the external threads of the second coupling nut are threaded into the internally threaded portion of the converter housing such that the plug portion of the fiber optic connector and cable assembly projects through the first opening in the converter housing and is disposed between the two paddles of the converter housing; and wherein the second shoulder of the connector housing of the fiber optic connector and cable assembly abuts against the first shoulder of the first side of the end wall of the converter housing when the external threads of the second coupling nut of the fiber optic connector and cable assembly are fully threaded into the internal threads of the internal passage of the converter housing.

13. The backward compatible fiber optic connector assembly of claim 12, wherein the fiber optic connector and cable assembly can be removed from the backward compatibility converter by unthreading the external threads of the second coupling nut from the internally threaded portion of the converter housing and axially pulling the fiber optic connector and cable assembly outwardly from the converter housing.

14. The backward compatible fiber optic connector assembly of claim 12, wherein the backward compatibility converter includes a sealing member mounted about the exterior of the converter housing at a location between the first coupling nut and the first end of the converter housing.

15. The backward compatible fiber optic connector assembly of claim 12, wherein the fiber optic connector and cable assembly includes a sealing member that is mounted about the exterior of the connector housing and in sealing engagement with a sealing surface of the converter housing.

16. The backward compatible fiber optic connector assembly of claim 12, wherein the first coupling nut of the backward compatibility converter includes a gripping portion.

17. The backward compatible fiber optic connector assembly of claim 16, wherein the gripping portion of the first coupling nut has an outer diameter that is larger than an outer diameter of the external threads of the first coupling nut.

18. The backward compatible fiber optic connector assembly of claim 12, wherein the second coupling nut of the fiber optic connector and cable assembly includes a gripping portion.

19. The backward compatible fiber optic connector assembly of claim 12, wherein the ferrule assembly of the fiber optic connector and cable assembly includes a spring for biasing the ferrule in the direction of connector insertion.

* * * * *